United States Patent Office 2,820,896
Patented Jan. 21, 1958

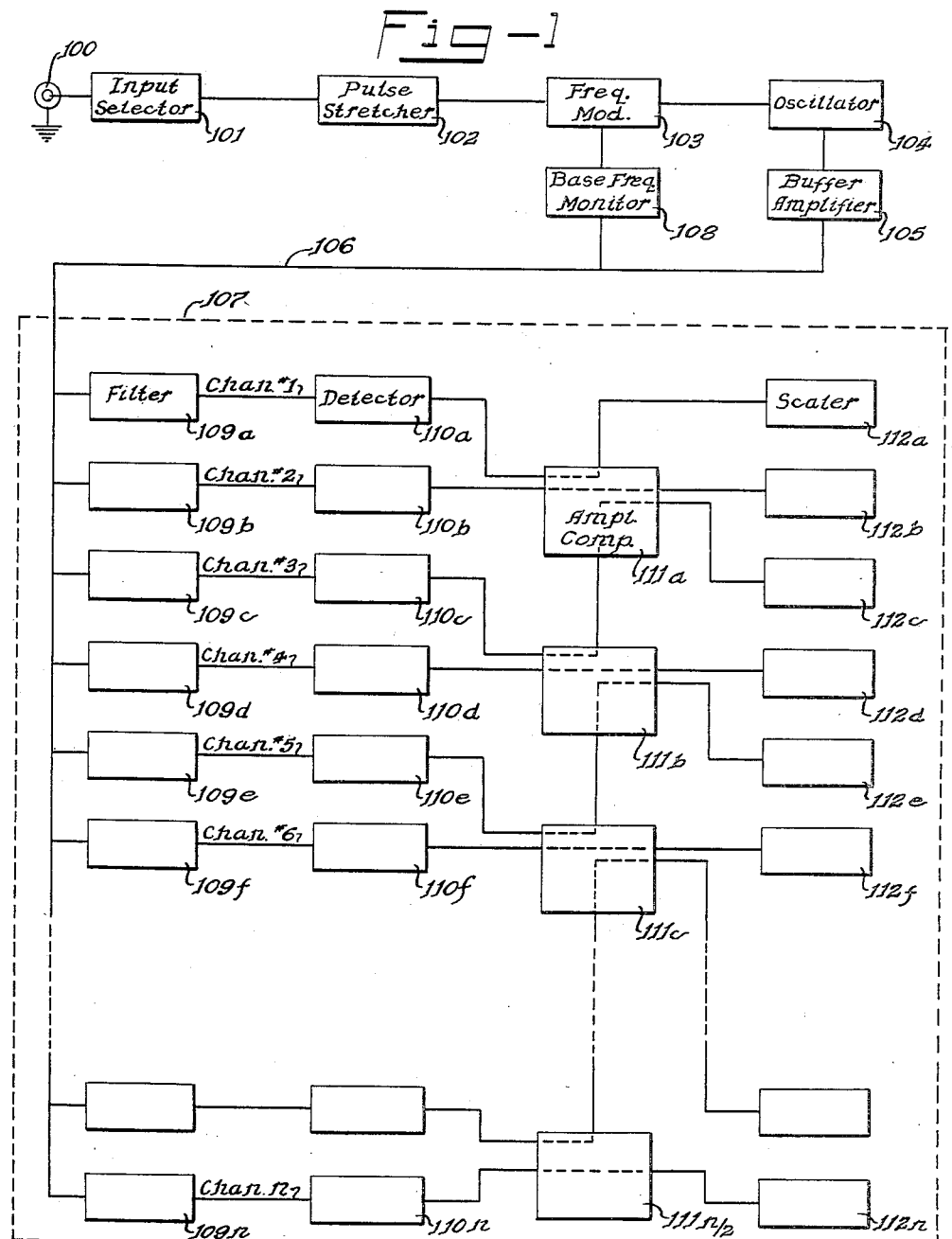

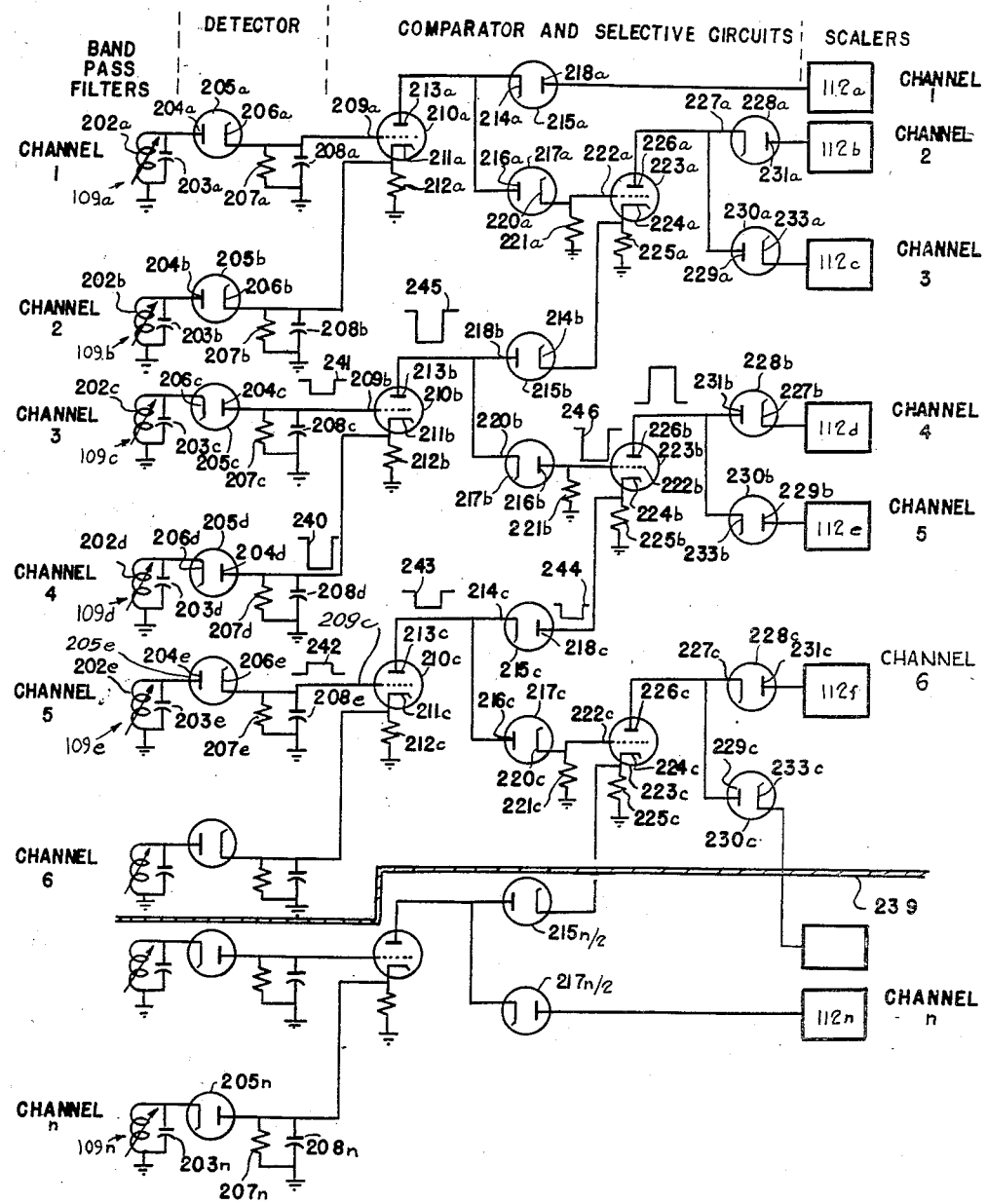

2,820,896

MULTICHANNEL PULSE-HEIGHT ANALYZER

James T. Russell, Seattle, and Harlan W. Lefevre, Richland, Wash., assignors to the United States of America as represented by the United States Atomic Energy Commission Application June 24, 1955, Serial No. 517,947

6 Claims. (Cl. 250—27)

This invention relates generally to electronic computing circuits and more particularly to pulse-height analyzers used for classifying variable amplitude pulses, corresponding to discrete units of energy, into groups of different amplitudes.

One of the best known devices for classifying information, which is obtained in various studies of natural phenomena, is the multichannel pulse-height analyzer. This device is particularly useful in the investigation of energy spectra of materials emitting particles due to radioactivity and nuclear reactivity. One type of a multichannel counting device, which is well known in the electronic art, comprises a series of counting circuits which are utilized to analyze and to record the pulse height (voltage amplitude) of a large number of randomly occurring pulses. These randomly occurring pulses are generated by ionizing events which are brought about by the bombardment of certain materials with radiation particles. The ionizing events are usually detected by ionization or scintillation detectors connected to the counting circuits. The pulse-height analyzers of this type generally include a plurality of discriminating circuits which are individually adjusted and made responsive only to pulses of predetermined voltage magnitude whereby each of the individual discriminating circuits will record an event if said event falls between upper and lower levels or boundaries of a preset range. Most of the discriminating circuits used in this type of pulse-height analyzer, utilize electron discharge devices or tubes which are biased to be responsive only to pulses of predetermined voltage magnitudes. One of the difficulties encountered in this pulse-height analyzer is the operational inability to maintain uniform adjustments for all of the discriminating circuits because of the changes that occurs in the various components, notably in the tubes. For example, if one of the discriminator circuits had a range determined by two voltage levels for acceptancle of pulses falling into said voltage range, and if for any reason a change occurred in one of the components comprising said discriminator circuit to shift or change the voltage range, the input pulses of a particular magnitude which would have been recorded previously by falling into the preset voltage range, would not be recorded in the shifted range if the pulses were outside of the shifted voltage range. In this situation, the pulses, which ordinarily would have been recorded in that particular voltage range, would be recorded in another range or channel, therefore, not indicating accurately the distribution of the energy in the spectrum.

It is an object of this invention to provide reliable means for analyzing random pulses and sorting them accurately into a number of channels according to their amplitudes.

Another object of the invention is to provide a pulse-height analyzer device which converts input random pulses into frequency signals corresponding to the magnitude of the random pulses, segregates the signals into pretuned frequency channels, and then records the signals according to channel distribution.

The present objects and advantages of this invention will become apparent and will be better understood by reference to the following description in conjunction with the accompanying drawings, wherein:

Fig. 1 shows a block diagram of a multichannel pulse-height analyzing device embodying the principles of the present invention; and Fig. 2 is a simplified schematic diagram illustrating circuit arrangements and components contained in the channels of the analyzing device.

In accordance with the teachings of the invention, there is provided a device for allocating input random pulses, corresponding to discrete units of energy, into channels according to the amplitude of said pulses. The device accomplishes this pulse allocation by converting the pulses into frequencies corresponding to the amplitudes of the pulses, which frequencies are filtered in channels individually pretuned to a particular frequency and then detected and recorded in the responsive channel.

Referring to Fig. 1, a multichannel pulse-height analyzer is shown comprising an input 100 connected to an input selector 101 which is connected through a pulse stretcher 102 to a frequency modulator 103 which is connected to an oscillator 104, the output of the oscillator being connected through a buffer amplifier 105 over a line 106 to a plurality of channels 1, 2, 3 . . . n found within a channel section 107. A base frequency monitor is connected between the line 106 and the frequency modulator 103 for reasons to be described hereinafter. The input selector 101 is provided for adjusting the analyzer so that a reasonable number of channels can analyze a wide voltage pulse spectrum with acceptable precision. The selector 101 will allow a portion of the spectrum to be expanded across a given number of channels for precise analysis or will compress the whole spectrum so that the same number of channels will cover the whole spectrum with less precision. The input selector 101 is thus a channel width adjustment and provides means for positioning a group of channels along the spectrum. The input selector 101 in the present embodiment is nothing more than an attenuator located at the input to the analyzer. The channels are positioned along a particular portion of a spectrum by simply changing the D. C. level of the entire spectrum with respect to the fixed cathode potential of a tube (not shown) in the input selector 101. For example, if the channel width at the modulator 103 is 0.1 volt and a 100:1 attenuator is used at the input to the selector 101, the channel width as seen from the input will be 100 times larger or ten volts wide. Similarly, other attenuation ratios may be utilized to give a desirable expansion or compression of the voltage pulse spectra. Another circuit which may be employed in the input selector 101 may be of the type described in reference to the expander-amplifier circuit discussed in "Pulse Amplitude Analysis in Nuclear Research" by A. B. Van Rennes, Nucleonics 10, No. 8, page 25.

The pulse stretcher 102 is used to lengthen the input pulse to insure that the pulse remains at a peak value long enough to allow the frequency of the oscillator 104 to shift to a new equilibrium corresponding to the magnitude of the input pulse, said equilibrium representing a frequency signal. The circuit utilized in the pulse stretcher 102 is also conventional and may utilize a good quality storage capacitor which is charged through a high back-resistance diode to a peak pulse potential. One conventional type of a circuit that may be used in the pulse stretcher 102 is described in "Pulse Amplitude Analysis in Nuclear Research" by A. B. Van Rennes,. Nucleonics 10, No. 10, page 51.

The frequency modulator 103 converts the input voltage to a reactance change to affect the operation of the oscillator 104, said change in reactance being some function of the input voltage. The circuit which comprises the frequency modulator 103 is conventional and well known in the frequency modulation art.

The oscillator 104 utilizes a circuit in conjunction with an oscillator tube (not shown) to generate a base frequency which serves as a reference for frequency deviations brought about by the input pulses. The oscillator 104 utilizes conventional circuits which may be used with discriminator or crystal stabilization to prevent zero drift. In the present embodiment, the oscillator frequency is maintained, during a resting period, at the proper base frequency by means of a discriminator frequency stabilization circuit.

The buffer amplifier 105 is used to isolate the oscillator 104 from the subsequent stages contained in the channel section 107. Sufficient amplification is obtained in the buffer amplifier 105 so that a usable output can be obtained from the stages contained in the channel section 107 without additional amplification. The circuit used in the buffer amplifier 105 may be any one of the conventional circuits used in the radio art.

High stability of the base frequency can be achieved only by continuous and automatic monitoring which is accomplished by the free base frequency monitor 108. Any base frequency deviation or drifting occurring in the oscillator 104 is picked up by the monitor 108 and compounded therein with the monitor frequency so that a bias voltage is applied to the modulator 103 to return the oscillator 104 to the correct base frequency. The circuits employed in the monitor 108, as indicated before, are also conventional and are similar to the discriminator frequency stabilization circuits used in commercial FM transmitters. It is to be understood that the discriminator frequency stabilization circuit in the monitor 108 exerts control over the oscillator 104 only during the resting period when no voltage is impressed on the oscillator by the modulator 103.

The output of the oscillator 104 is amplified and fed to the channel section 107 over the line 106. The channel section 107 comprises a series of band-pass filters 109a, 109b, 109c . . . 109n which are commonly connected to the lead 106 and are tuned to pass a particular frequency. The outputs of the band-pass filters 109a, 109b, 109c . . . 109n are connected to a series of detectors 110a, 110b, 110c . . . 110n, respectively. The outputs of all the detectors 110a, 110b, 110c, . . . 110n are connected to a series of amplitude comparators 111a, 111b, 111c, . . . 111n/2. Each amplitude comparator is directly connected to the output of a separate pair of adjacent detectors; for instance, amplitude comparator 111a is directly connected to the outputs of detectors 110a and 110b and amplitude comparator 111b is directly connected to the outputs of detectors 110c and 110b. Common connections exist between adjacent amplitude comparators so that signals from all adjacent channels may be compared with each other in the comparator stage. Recording means such as scalers 112a, 112b, 112c, 112d, . . . 112n are connected to the outputs of amplitude comparators and are associated with each of the channels. The scalers 112a, 112b and 112c associated with the first three channels are all connected to the amplitude comparator 111a. The remaining scalers are connected in pairs to the same amplitude comparator. For instance, scalers 112d and 112e are connected to the common comparator 111b. The last scaler 112n is the only scaler connected to the last amplitude comparator 111n/2.

In order to show the plan of connection in the channel section 107, the first four channels will be discussed. The band-pass filter 109a of channel 1 is connected directly to its detector 110a, the output of which is fed into the amplitude comparator 111a. The output of band-pass filter 109b is fed into the detector 110b and in turn passed into the amplitude comparator 111a. The scalers 112a and 112b, associated with channels 1 and 2, respectively, are associated with their respective channel inputs to the comparator as noted by the dotted lines in the comparator block 111a. Channel 3 has a band-pass filter 109c which feeds its input into the detector 110c. The output of detector 110c is directly connected to amplitude comparator 111b which has an output connection to the amplitude comparator 111a. Scaler 112c, is connected to amplitude comparator 111a by a lead which is associated with the lead between amplitude comparator 111b and 111a as noted by the dotted line in the comparator block. The band-pass filter 109d of channel 4 is connected to the detector 110 which in turn is connected to the amplitude comparator 111b. The scaler 112d, associated with channel 4, is connected to the output of comparator 111b and is associated with the channel 4 input to the comparator is represented by the dotted line therein. The remaining channels are similarly connected as described above except that the last two channels are so connected that the last amplitude comparator 111n/2 has only one scaler, 112n, connected to its output. In effect, the various circuits (block form) described so far are systematically grouped into channels, each channel possessing its individual filter, detector and scaler circuits and being commonly interconnected to the other channels through the amplitude comparators. The frequency signal output from the oscillator 104 is transmitted over the line 106 to all of the commonly connected band-pass filters 109a, 109b, 109c . . . 109n. The dotted lines in the channel section 107 between the channels 6 and n indicate that any number of channels may be used depending on the particular requirements of the spectrum analysis desired to be performed. For example, the number of channels contained in this embodiment may be considered to comprise 30 channels. Each of the band-pass filters, such as 109a, is tuned to a particular frequency band. One of these filters will be more responsive than the others and allow the frequency signal to pass through and be detected by the detector associated with that particular filter. The filters in the channels adjacent to the channel containing the responsive filter will also allow the frequency signal to pass through, but the frequency signal will be attenuated and will only be detected as a weak pulse. The outputs of the detectors are fed to the comparator stages, the function of the comparator stages being to determine which signal fed thereto is the strongest one and to allocate said strongest signal into the scaling circuit associated with the most responsive channel.

The different circuits that are contained in the various blocks shown in Fig. 1, will now be discussed in detail in reference to Fig. 2. In order to simplify the discussion on the method of connecting various components in each channel, only a few channels will be discussed in detail; it being obvious that similarly related components in the other channels are similarly connected. Channel 1 contains the band-pass filter 109a comprising a tunable secondary winding 202a having connected across its two extremities a tunable capacitor 203a, the primary winding contained in the band-pass filter not being shown. One end of the parallel connection of the secondary winding 202a and the capacitor 203a is connected to ground and the other end is connected to a plate 204a of a detector tube 205a. The cathode 206a of the tube 205a is connected to ground through a parallel network comprising the resistor 207a and a turnable capacitor 208a, said cathode also being connected to a grid 209a of a triode tube 210a. The cathode 211a of the tube 210a is connected through a resistor 212a to ground and the plate 213a is connected to a cathode 214a of the tube 215a, as well as being connected to a plate 216a of a tube 217a. The plate 218a of the tube 215a is connected to a receiving means such as a scaling circuit 112a commonly called a scaler. The cathode 220a of the tube 217a is connected through a resistor 221a to ground and also to a grid 222a of a triode tube 223a. The cathode 224a of the tube 223a is connected to ground through a resistor 225a, and the plate 226a of said tube is connected to a cathode 227a of a tube 228a and to a plate 229a of a tube 230a. The plate 231a of the tube 228a is connected to a scaler 112b. The cathode 233a of the tube 230a is connected to a scaler 112c.

Channel 2 comprises a band-pass filter 109b and a detector 205b. The band-pass filter 109b comprising a tunable secondary winding 202b across which is connected in tunable capacitor 203b. One end of the parallel connection of said winding 202b and the capacitor 203b is connected to ground and the other end is connected to a plate 204b of the detector tube 205b. The cathode 206b of the tube 205b is connected through a parallel network comprising a resistor 207b and a capacitor 208b to ground and also to the cathode 211a of the tube 210a.

Channel 3 comprises a band-pass filter 109c and a detector stage having a tube 205c. The band-pass filter 109c comprises a tunable secondary winding 202c across which end is connected a turnable capacitor 203c. One end of the parallel connection of said winding 202c and the capacitor 203c is connected to ground and the other end is connected to a cathode 206c of the tube 205c. The plate 204c of the tube 205c is connected through a parallel network comprising a resistor 207c and a tunable capacitor 208c to ground, and also to a grid 209b of a triode tube 210b. The cathode 211b of the tube 210b is connected through a resistor 212b to ground, and the plate 213b is connected to a plate 218b of a tube 215b and also to a cathode 220b of a tube 217b. The cathode 214b of the tube 215b is connected to the cathode 224a of the tube 223a. The plate 216b of the tube 217b is connected through a resistor 221b to ground and also connected to a grid 222b of the tube 223b. The cathode 224b of the tube 223b is connected through a resistor 225b to ground. The plate 226b of the tube 223b is connected to a plate 231b of a tube 228b and also to a cathode 233b of a tube 230b. The cathode 227b of the tube 228b is connected to a scaler 112d. The plate 229b of the tube 230b is connected to a scaler 112e.

Channel 4 comprises a band-pass filter 109d and a detector tube 205d wherein the band-pass filter 109d comprises a tunable secondary winding 202d having connected in parallel thereacross a tunable capacitor 203d. One end of the parallel connection being connected to ground and the other connected to a cathode 206d of the tube 205d. The plate 204d of the tube 205d is connected to a parallel network of a resistor 207d and a tunable capacitor 208d to ground, said plate also being connected to the cathode 211b of the tube 210b.

Similarly, channel 5 has a band-pass filter 109e connected to a detector tube 205e. The band-pass filter 109e has a tunable secondary winding 202e connected in parallel with a tunable capacitor 203e, one end of said parallel connection being connected to ground and the other connected to a plate 204e of the tube 205e. The cathode 206e of the tube 205e is connected through a parallel network comprising a resistor 207e and a tunable capacitor 208e to ground and also connected to a grid 209c of a tube 210c. The cathode 211c of the tube 210c is connected through a resistor 212c to ground and the plate 213c is connected to a cathode 214c of a tube 215c and also to a plate 216c of a tube 217c. The plate 218c of the tube 215c is connected to the cathode 224b of the tube 223b. The cathode 220c of the tube 217c is connected through a resistor 221c to ground and also to a grid 222c of a triode tube 223c. The cathode 224c of the tube 223c is connected through a resistor 225c to ground. The plate 226c of the tube 223c is connected to a cathode 227c of a tube 228c and also to a plate 229c of a tube 230c. The plate 231c of the tube 228c is connected to a scaler 112f. The cathode 233c of the tube 230c is connected to a scaler 112g.

The method of connecting the various circuits contained in each channel for the remaining channels is rather obvious from the discussion of the first five channels and will not be treated in detail. A break line 239 indicates that additional channels may be interposed between channel 6 and the last channel. It is of interest to note that the tubes in the various detector stages are not all similarly connected in all channels, for example, the tubes 205a and 205b have their respective plates connected to the filter stages, whereas the tubes 205c and 205d, in the next two channels, have their respective cathodes connected to the filter stages. It is also of interest to note that the amplitude comparator 111n/2 associated with the last two channels comprises only one amplifier triode 210n/2 and one set of selector diodes 215n/2 and 217n/2. A second amplifier and selector stage are not necessary since the comparator has only one output direct to a scaler.

Operation

The operation of the pulse analyzer will now be described in reference to Figs. 1 and 2. A series of input random pulses available at the terminal 100 are impressed across the input selector 101. The output of the input selector 101 is connected to the pulse stretcher 102 and the output of the latter stage is connected to the frequency modulator 103. Depending on the magnitude of the input signal, the frequency modulator 103 will respond thereto and control the oscillator stage 104 in such a manner that the oscillator will be caused to change from its base operating frequency to another frequency which corresponds to the voltage magnitude of the input signal. The output of the oscillator 104 is connected through the buffer amplifier 105 to the line 106 and impressed across the series of tuned band-pass filters 109a, 109b, 109c ... 109n.

The band-pass filters 109a, 109b, 109c ... 109n are individually adjusted to particular frequencies either in the ascending or descending order of magnitudes. The output of each band-pass filter, such as 109b, is connected to a detector tube such as 205b, wherein it is detected and impressed across a series of triodes 210a, 210b ... 210n, such as cathode 211a of the triode tube 210a. Thereafter, the output of the triode tubes 210a, 210b ... 210n is impressed across selective circuits comprising a series of pairs of tubes 215a and 217a, 215b and 217b ... 215n/2 and 217n/2, one of which said tubes, depending on the polarity of the output, will rectify the output and impress it across a series of triode tubes 223a, 223b, etc. The function of said last triode tubes, such as 223a, is to combine algebraically the outputs of two adjacent channels, such as channels 2 and 3, and impress the resultant output across selective circuits comprising a final series of pairs of detectors 228a and 230a, 228b and 230b, etc. The function of the last series of pairs of detectors such as 228a and 230a, is to have one of the detectors in the pair, depending on the polarity of the output, to rectify the output and to have it recorded on one of the scalers 112a, 112b ... 112n, such as 112b or 112c, again depending on the polarity of the output.

In order to discuss specifically the manner in which the various components in adjacent channels cooperate to select the strongest frequency pulse, it will be assumed that the output of the oscillator 104 corresponds to the frequency to which channel 4 is pretuned. If the frequency signal on the line 106 corresponds to the frequency setting on the band-pass filter 109d in channel 4, this signal impressed across the filter unit 109d will be rectified by the diode 205b and cause a negative pulse 240 to appear at the cathode 211b of the triode tube 210b. Although the band-pass filters 201c and 201e in the adjacent channels 3 and 5, respectively, are individually pretuned to a frequency differing from that of the band-pass filter 201d, nevertheless, a certain amount of signal will pass through the band-pass filters in the adjacent channels 3 and 5. The signal voltage, however, will be of smaller magnitude than the signal voltage passing through the properly tuned band-pass filter 201d. As a result, a weak voltage pulse will be developed across the band-pass filter 201c and the diode 205c thereby impressing a weak negative voltage pulse 241 on the grid 209b of the triode tube 210b; and, the weak voltage developed across the band-pass filter 201e will be rectified by the tube 205e to produce a weak positive pulse 242 which is applied to the grid 209c of the triode tube 210c causing same to conduct and cause a negative pulse 243 to be applied to the cathode 214c of the tube 215c. The negative pulse 243 will be rectified by the tube 218c resulting thereby in a negative voltage pulse 244 which is impressed on the cathode 224b of the triode tube 223b. The triode tube 210b has two voltage pulses impressed thereon, one on the grid 109b and the other on the cathode 211b. The pulse 241, being of negative polarity, will tend to cause a positive pulse to appear at the plate 213b and the pulse 240 being also of negative polarity, will tend to cause a negative pulse to appear at the plate 213b. The net result of the two negative driving pulses, a weak one being impressed on the grid 209b and a strong one on the cathode 211b, is to cause the appearance of a strong negative pulse 245 at the plate 213b of the tube 215b and the cathode 220b of the tube 217b. Because of the negative polarity of the pulse 245, tube 217b will conduct and generate a negative pulse 246 which is impressed on the grid 222b of the triode tube 223b. As it stands at the present time, the triode tube 223b receives control voltages on two of its electrodes, namely a negative pulse 246 on the grid 222b and a negative pulse 244 on its cathode 224b. The pulse 246 on the grid 222b will tend to cause a positive pulse to appear at the plate 226b and the negative polarity pulse 244 on the cathode 224b will tend to cause a negative pulse to appear at the plate 226b; the algebraic resultant of the two pulses appearing at the plate 226b being impressed on the plate 231b of the tube 228b and on the cathode 233b of the tube 230b. Because of the manner of connection of the tubes 228b and 230b, current transmission will be effected only through the tube 228b and its associated scaler 112d causing said scaler to record the event.

As was indicated before, each pair of channels differs from each pair of adjacent channels in the manner of connection of electrodes in the detector stages to the filters. The detectors in each pair of channels will produce the same type of pulse upon receipt of a frequency signal. For example, the detectors 205c and 205d in the pair of channels 3 and 4 produce negative pulses 241 and 240, respectively. On the other hand, the pulses produced in the next pair of channels 5 and 6 are positive. The pulses of each pair of channels are then fed into a comparator stage having a triode which puts out either a negative or a positive pulse depending on the stronger input pulse. The output pulse of the triode is then impressed across a selective circuit comprising a pair of diode tubes, such as 215b and 217b. Similarly, the adjacent pairs of channels will impress their output pulses on their individually associated selective circuits. Each selective circuit selectively determines with which output pulse, existing in the adjacent pair of chanels, its own output pulse should be compared. Continuing with the example, channels 1 and 2 represent a pair of channels on one side of the pair of channels 3 and 4 and channels 5 and 6 represent a pair of channels on the other side. In the particular example discussed, the selective circuit comprising tubes 215b and 217b will impress the output pulse on another comparator circuit, such as the circuit comprising tube 223b, which will combine it with an output pulse in an adjacent channel to produce a pulse which will be effective to operate the receiving means found in the channel receiving the strongest pulse. Briefly stated, the first comparator stage determines which of the two pulses received by a pair of channels is stronger, the selective stage associated with said first comparator stage then determines with which one (stronger) of the pulses in the two adjoining pairs of channels, its own (stronger) pulse should be compared, and, finally, the second comparator stage comprises the two selected pulses and enables the selected (stronger of the two) pulse to be recorded in the scaler circuit associated with the channel which received the strongest pulse.

In the present instrument, the rise time of the input pulses is fast enough so that no output is produced in intermediate channels as the frequency sweeps past them to its new equilibrium level. During the description of the preferred embodiment presented hereinbefore, it was indicated that the detectors used in the various stages of the channels were tubes; however, any type of diodes, such as germanium diodes, may be used in lieu of said tubes.

While there has been described what is at present considered to be the preferred embodiment of the invention, it will be understood that various modifications may be made therein and it is intended in the appended claims to cover all such modifications as found within the true spirit and scope of the invention.

What is claimed is:

1. A device for segregating random pulses according to their amplitudes into channels, comprising, in combination, a source of random input pulses, an input circuit connected to the source for shaping said pulses, a frequency modulated oscillator including an output connected to the input circuit for generating frequency signals corresponding to the amplitude of the shaped pulses, a plurality of band-pass filters connected to the output of said oscillator, each of said filters being pretuned to a different frequency, a plurality of detectors connected to the band-pass filters for rectifying signals impressed thereacross, each of said detectors associated with one of said band-pass filters, a series of amplitude comparators connected to the detectors and adapted to pass the strongest signal developed across one of said filters, each of the amplitude comparators connected to a separate pair of adjacent detectors, a scaler circuit associated with each band-pass filter and connected to at least one amplitude comparator for recording the output of the amplitude comparator whereby an input pulse which is converted to a frequency signal is passed through a filter which is responsive to said frequency and then recorded thereafter in the scaler circuit associated with said filter.

2. A device for segregating and recording pulses of selected amplitudes provided by a source having randomly occuring pulses of varying amplitudes, comprising means connected to the source for generating voltage signals of different frequencies corresponding to the amplitude of the input signals, a plurality of channels, each of said channels comprising a filter circuit tuned to a particular frequency, a detector connected to the filter circuit for rectifying the signal voltage, and a scaler circuit coupled to the detector for recording the signal voltage, and an amplitude comparator associated with each pair of adjacent channels to select the signal voltage of the greater amplitude, said amplitude comparator connected to a pair of adjacent detectors and to a pair of adjacent scaler circuits to impress a signal voltage on one of the scalers associated with the filter receiving the strongest signal, whereby the output of the frequency generating means is admitted into a tuned channel most responsive to the frequency of the output and is recorded thereafter in the scaler circuit associated with said tuned channel.

3. A device for segregating and recording voltage pulses of selected amplitudes received from a source of random pulses of different amplitudes, comprising an input selector circuit connected to said source for varying the reference voltage base of the input circuit with respect to the pulse voltages, a pulse stretcher connected to the input selector circuit for lengthening the input pulses, a frequency modulated oscillator having an output, a frequency modulator circuit connected between said pulse stretcher and the oscillator to control the oscillator in response to the amplitude of input pulses, a base frequency monitor connected to the frequency modulator to control the frequency modulator circuit, a buffer amplifier connected to the oscillator to amplify the oscillator output, a plurality of channels connected to the buffer amplifier, each of said channels comprising a band-pass filter tuned to a particular frequency and having an output, a detector connected to each of said filters for rectifying the output, and a scaler associated with each channel for recording pulses accepted therein, and a plurality of amplitude comparators connected between the detectors and the scalers and adapted to select the strongest signal developed across said filters, each of said comparators associated with a pair of adjacent detectors and a pair of adjacent scalers, whereby one of said comparators will allow the signal to be recorded by the scaler associated with the channel most responsive to the frequency of the signal.

4. A device for analyzing a multitude of random pulses extending over a wide energy spectrum by allocating the pulses according to the magnitude thereof into channels, comprising, in combination, a source of pulses, means connected to the source for selecting a particular portion of the spectrum to be analyzed, an oscillator coupled to the selecting means for producing a wide range of frequency signals, a modulator connected to the oscillator to control the operation thereof in accordance to the amplitude of the input pulses, a pulse stretcher connected between the selector means and the modulator to maintain each input pulse for a given period of time to initiate the operation of the modulator, a plurality of channels having filters and detectors associated therewith and connected to the oscillator, each of said filters tuned to a particular frequency and adapted to cooperate with its associated detector to produce an output signal, means associated with each detector to record the output, and means coupled between said detectors and register means to select the strongest output and impress it across one of said register means, whereby the output signal is recorded in the channel which is most responsive to the frequency of the signal impressed across all of the filters.

5. A circuit for sorting a plurality of variable frequency signals according to their frequencies, comprising a plurality of channels arranged in pairs, means in each channel pretuned to a particular frequency and adapted to produce a current of a magnitude corresponding to the proximity of the frequency of the signal to the pretuned frequency, individual means connected to the pretuned means for rectifying said current to produce an output, the outputs of each pair of channels being of same polarity but differing in polarity from the outputs in the adjacent channel pairs, means common to both channels in each of said pairs of channels and connected to the rectifying means to amplify the stronger output and produce a polarized pulse, selective means connected to each amplifying means for applying said polarized pulse, depending on polarity to another amplifying means, each of the second amplifying means connected to the selective means of two adjacent pairs of channels to amplify the stronger of the two polarized pulses provided by the two adjacent pairs of channels, a plurality of receiving means and an individual selective means connected to each second amplifying means for channeling the pulse, depending on polarity, into the receiving means associated with the channel being most responsive to the frequency of the received signal.

6. A circuit for sorting a plurality of variable frequency signals according to their frequencies comprising a plurality of channels arranged in pairs, means in each channel pretuned to a particular frequency and adapted to produce a voltage of a magnitude corresponding to the proximity of the frequency to the pretuned frequency, a selector associated with each pair of channels for selecting and passing on the strongest of the two voltages received from the associated channels, a second selector associated with adjacent pairs of channels for selecting and passing on the strongest of the two voltages received from the adjacent pairs of channels and means for recording the voltage passed on by such second selector.

References Cited in the file of this patent

UNITED STATES PATENTS

| | | |
|---|---|---|
| 2,492,134 | Cole | Dec. 27, 1949 |
| 2,529,666 | Sands | Nov. 14, 1950 |